(12) United States Patent
Maglica et al.

(10) Patent No.: US 10,050,454 B2
(45) Date of Patent: *Aug. 14, 2018

(54) CRADLE FOR RECHARGEABLE LIGHTING DEVICES

(71) Applicant: Mag Instrument, Inc., Ontario, CA (US)

(72) Inventors: Anthony Maglica, Ontario, CA (US); Eric Melton, Ontario, CA (US); Eric Terberg, Ontario, CA (US)

(73) Assignee: MAG INSTRUMENT, INC., Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,294

(22) Filed: Sep. 19, 2017

(65) Prior Publication Data

US 2018/0006476 A1 Jan. 4, 2018

Related U.S. Application Data

(63) Continuation of application No. 14/153,850, filed on Jan. 13, 2014, now Pat. No. 9,812,880.

(60) Provisional application No. 61/751,930, filed on Jan. 13, 2013.

(51) Int. Cl.
*H02J 7/00* (2006.01)
*H02J 7/14* (2006.01)
*F21L 4/08* (2006.01)

(52) U.S. Cl.
CPC .......... *H02J 7/0042* (2013.01); *H02J 7/0044* (2013.01); *H02J 7/0047* (2013.01); *F21L 4/085* (2013.01); *H02J 7/0045* (2013.01); *H02J 7/0052* (2013.01); *H02J 7/0068* (2013.01)

(58) Field of Classification Search
USPC ........ 320/107, 115, 116, 114, 113, 112, 134, 320/108, 110, 111, 118; 362/183
See application file for complete search history.

(56) References Cited

U.S. PATENT DOCUMENTS

| | | | | |
|---|---|---|---|---|
| 5,165,048 A * | 11/1992 | Keller | ...................... | F21L 4/085 320/113 |
| 5,413,223 A * | 5/1995 | Kang | ...................... | F21L 15/08 206/349 |
| 5,432,689 A * | 7/1995 | Sharrah | .................... | F21L 4/085 362/183 |
| 5,847,541 A * | 12/1998 | Hahn | ...................... | H01R 27/00 320/111 |
| 6,102,284 A * | 8/2000 | Myers | ................... | G06F 1/1632 235/375 |
| 6,313,604 B1 * | 11/2001 | Chen | ..................... | H01M 10/46 320/114 |

(Continued)

*Primary Examiner* — Alexis Pacheco
(74) *Attorney, Agent, or Firm* — Roy L Anderson

(57) ABSTRACT

A charger cradle for recharging a rechargeable lighting device is described. The cradle may include two prongs that flex outwards to allow a lighting device to be inserted into the cradle. After the lighting device is fully inserted, the prongs resume a normal position to exert an inward force on the lighting device to secure it in place. The cradle may also include two moveable cradle arms, in lieu of two prongs, to allow a spring mechanism within the device to motivate the moveable cradle arms to grasp a lighting device when the lighting device is inserted into the rechargeable lighting device.

10 Claims, 8 Drawing Sheets

(56) References Cited

U.S. PATENT DOCUMENTS

| | | | |
|---|---|---|---|
| 6,652,115 B2 * | 11/2003 | Sharrah | F21L 4/085 320/113 |
| 6,980,836 B1 * | 12/2005 | Skiles | B60R 11/0241 379/428.02 |
| 8,449,135 B2 * | 5/2013 | Wright | B25B 23/18 320/107 |
| 2002/0064041 A1 * | 5/2002 | Parker | H02J 7/0042 362/183 |
| 2005/0194930 A1 * | 9/2005 | Barbeau | F21L 2/00 320/116 |
| 2005/0196999 A1 * | 9/2005 | Chang | B60R 11/0241 439/345 |
| 2006/0208695 A1 * | 9/2006 | Weinstein | H01M 2/1022 320/110 |
| 2007/0279002 A1 * | 12/2007 | Partovi | H02J 7/0027 320/115 |
| 2009/0096411 A1 * | 4/2009 | Vanska | H02J 7/0044 320/107 |
| 2011/0255275 A1 * | 10/2011 | Devaney | F21L 4/04 362/183 |
| 2012/0276962 A1 * | 11/2012 | Brzana | H04M 1/04 455/575.1 |

\* cited by examiner

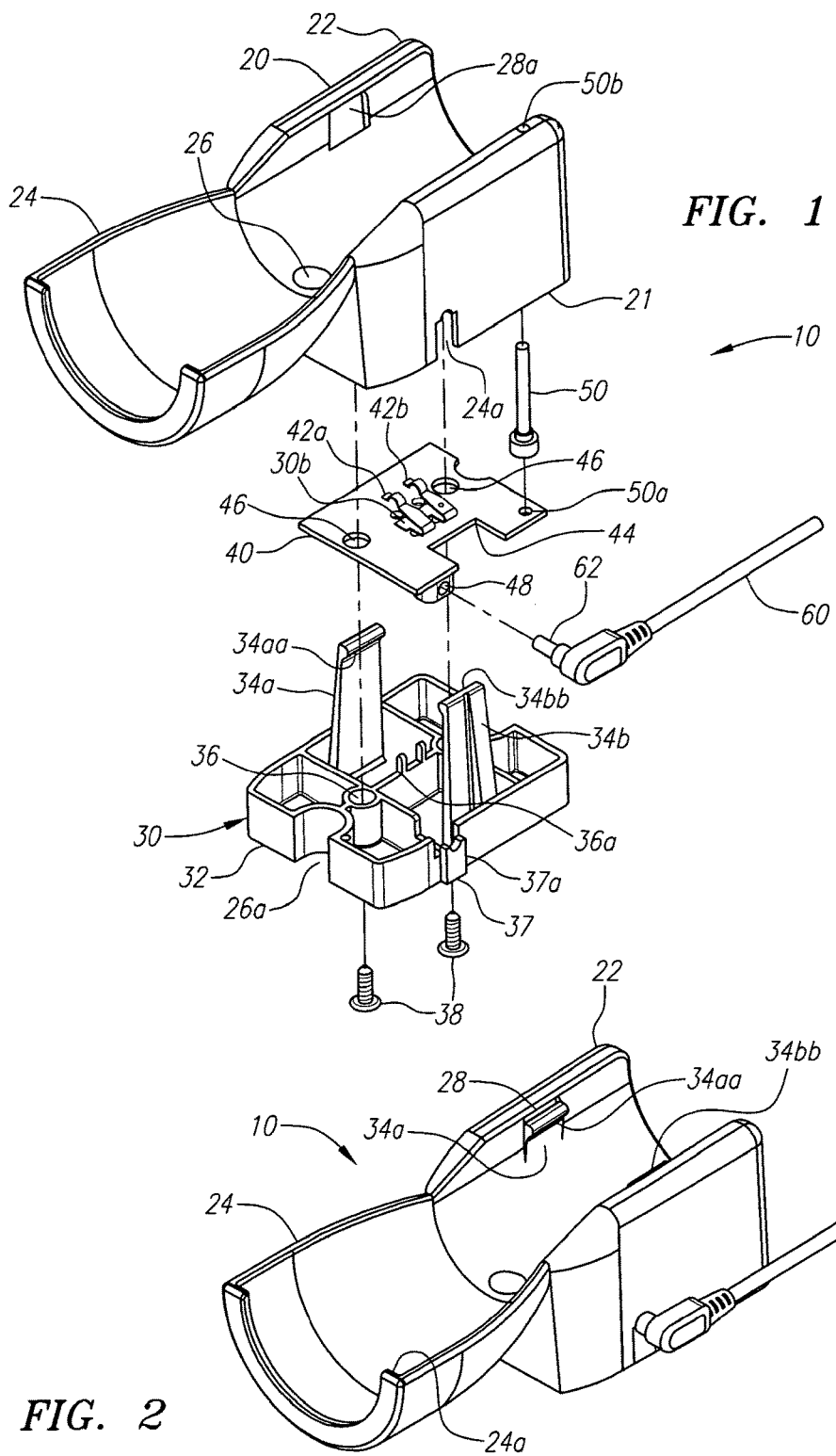

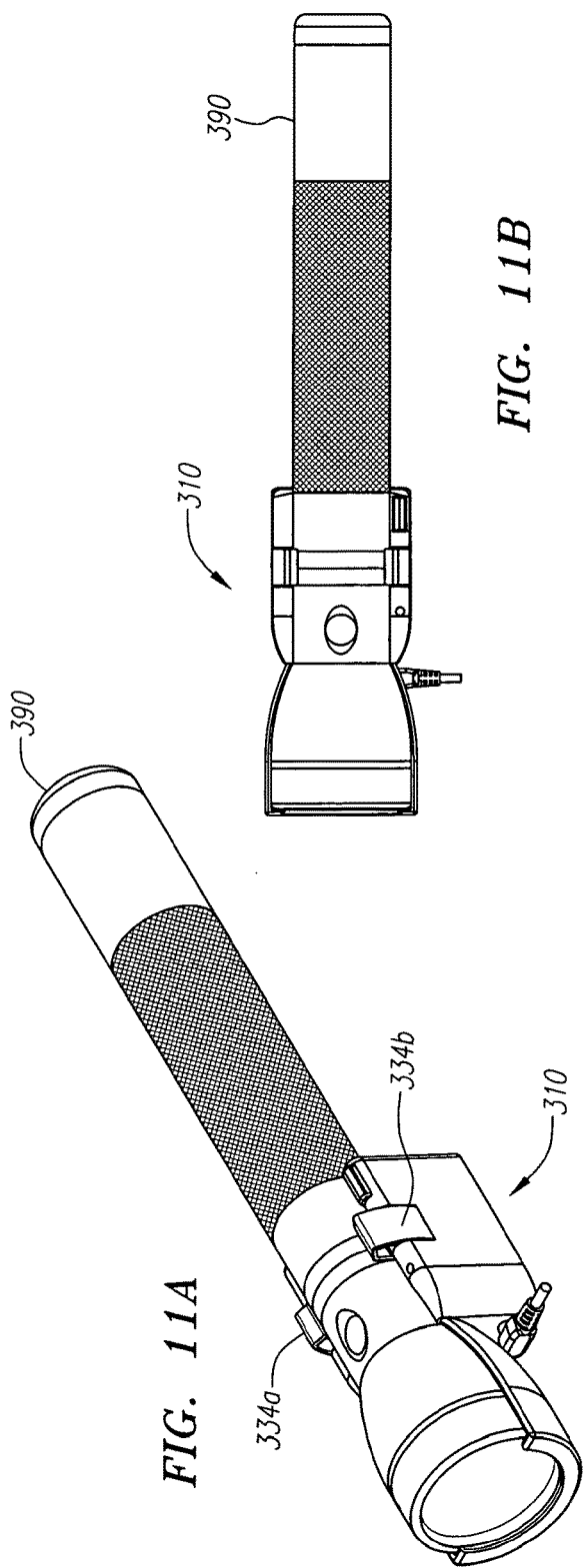
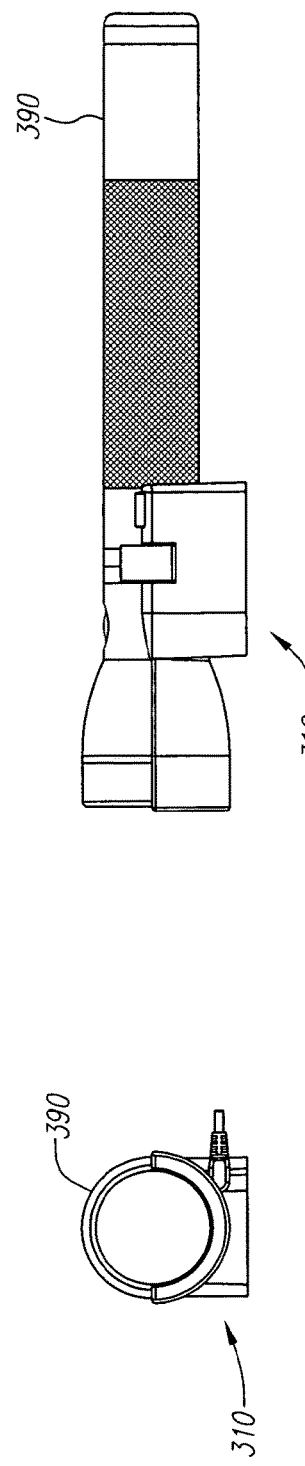
FIG. 11A
FIG. 11B
FIG. 11C
FIG. 11D

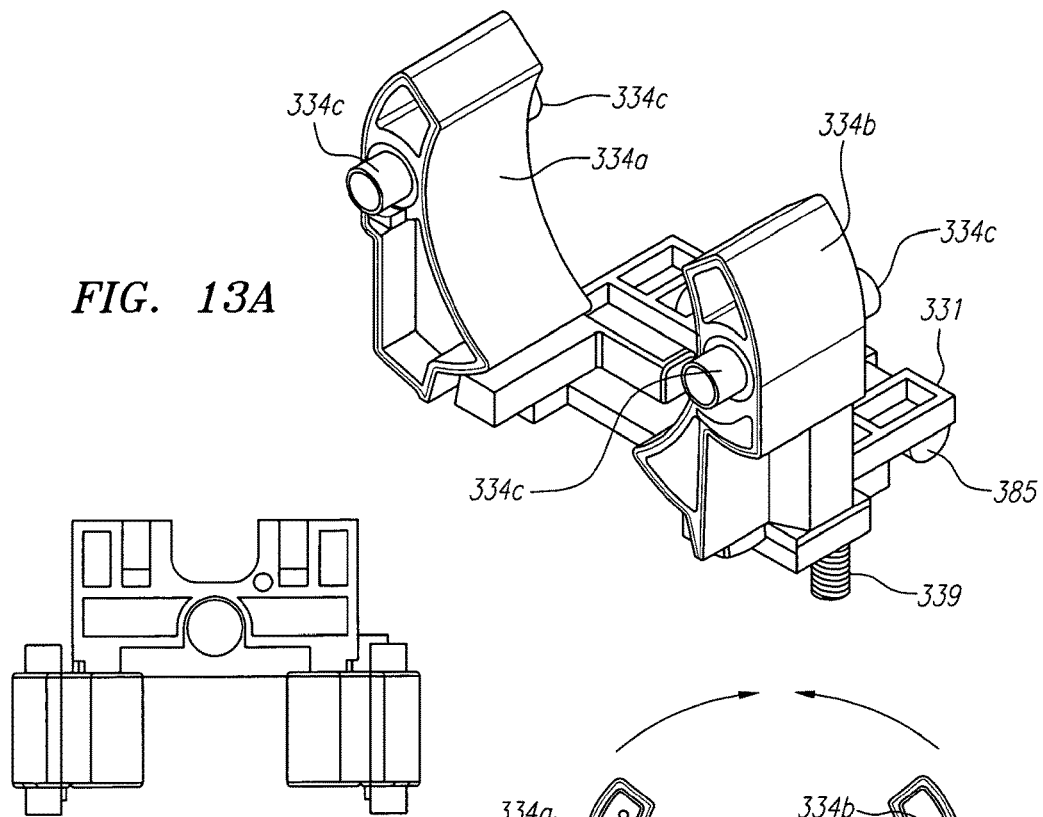
FIG. 13A
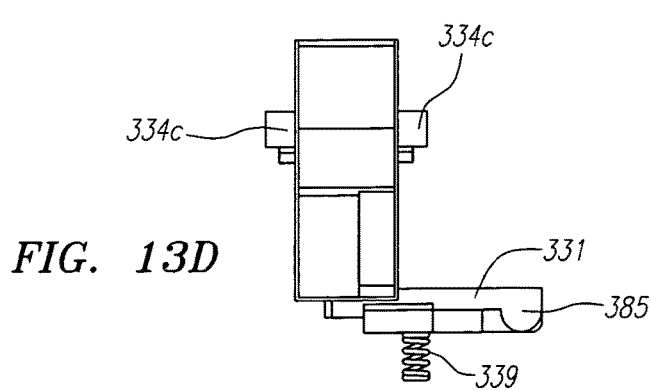
FIG. 13B
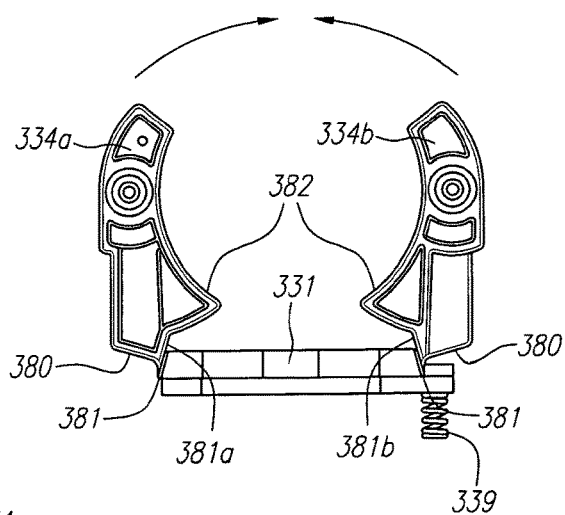
FIG. 13C
FIG. 13D

CRADLE FOR RECHARGEABLE LIGHTING DEVICES

CROSS-REFERENCE TO RELATED APPLICATION

This application is a continuation of U.S. Ser. No. 14/153,850, filed Jan. 13, 2014, which itself claimed the benefit of U.S. Provisional Application Ser. No. 61/751,930, filed Jan. 13, 2013, the contents of all of which are incorporated by reference as if fully set forth herein.

FIELD OF THE INVENTION

The field of the invention generally relates to cradles that may receive and recharge a lighting device that has a rechargeable power source, including charging cradles for rechargeable flashlights.

BACKGROUND OF THE INVENTION

Rechargeable flashlights and other lighting devices have existed for some time. These types of devices are often sold with some type of recharging device. Recharging devices may have different designs. Certain recharging devices may plug into the device. Other recharging devices may comprise a cradle that receives the lighting device and makes electrical contact with the device to charge it.

Certain existing cradles may contain a number of components that may increase cost and complexity. Such cradles may also be prone to breaking. In addition, existing cradles may be large and cumbersome to store away properly when not in use, and difficult to take on travel because of their larger size. Other existing cradles may be difficult to understand how they are to be properly configured with a rechargeable lighting device, and may not be intuitively easy to operate thus leading to an unsatisfactory user experience. In addition, other existing cradles may not allow for the cradle and lighting device combination to be mounted on a wall, in a car or to some other mounting surface to keep them safe and conveniently stored when not in use and when recharging. Also, other existing cradles may not adequately secure the lighting device within the cradle during a recharging or storing function. Accordingly, there is a need for an improved charging cradle that addresses the foregoing and other issues.

SUMMARY OF THE INVENTION

In a first aspect of the invention, a charging cradle having a simplified design is disclosed. That is, the cradle may include fewer components which may facilitate manufacturing and lower cost. This also preferably increases reliability and durability.

In another aspect of the invention, a charging cradle having a more compact and portable design is disclosed. That is, the cradle may be smaller in size and may have fewer components that protrude from the main body of the cradle. This may make the cradle easier to store and to take on travel. This also preferably increases reliability and durability.

In another aspect of the invention, a charging cradle having an easy to understand method of use is disclosed. That is, the cradle may be intuitively easy to understand how to set up and operate which may facilitate a more successful and pleasant experience for the user.

In another aspect of the invention, a light pipe may be used to indicate when the lighting device is fully charged or is still charging.

In another aspect of the invention, a printed circuit board may be included to facilitate charging and/or other functions. The PCB may be configured to accommodate the shape and size of other components of the cradle to help maintain a compact overall design. To this end, the PCB may include a port to receive a power source and/or charging plug, and the location of the port may vary to facilitate a compact overall design.

In another aspect of the invention, different types of arms that may hold the flashlight or other lighting device while charging or storing are described. In one embodiment, prongs may be used which are flexible enough to receive the lighting device, but stiff enough to hold the lighting device in place in the cradle.

In another embodiment, cradle arms may be used that interact with the rest of the cradle to provide an open position to receive the lighting device and a closed position to securely hold the lighting device during a charging operation or storage. To this end, the cradle may include a cradle arm stop that is generally forced upward by a spring while the cradle arms are in an open position. And when the lighting device is placed into the cradle, the cradle arm stop may be pushed downward against the force of the spring, thereby allowing the cradle arms to snap or shift into a closed position. A release button may then be used to allow the cradle arm stop to return to its original position thereby releasing the lighting device from the cradle arms.

BRIEF DESCRIPTION OF THE DRAWINGS

FIG. 1 is an exploded view showing the components of a charger cradle.

FIG. 2 is a perspective view of the assembled charger cradle.

FIGS. 11A, 11B, 11C and 11D are perspective, top, side and end views showing an assembled charger cradle with a flashlight inserted.

FIG. 13A, 13B, 13C and 13D are perspective, top, front and side views depicting cradle arms in a closed mode.

DETAILED DESCRIPTION OF THE PREFERRED EMBODIMENTS

Figure 3:
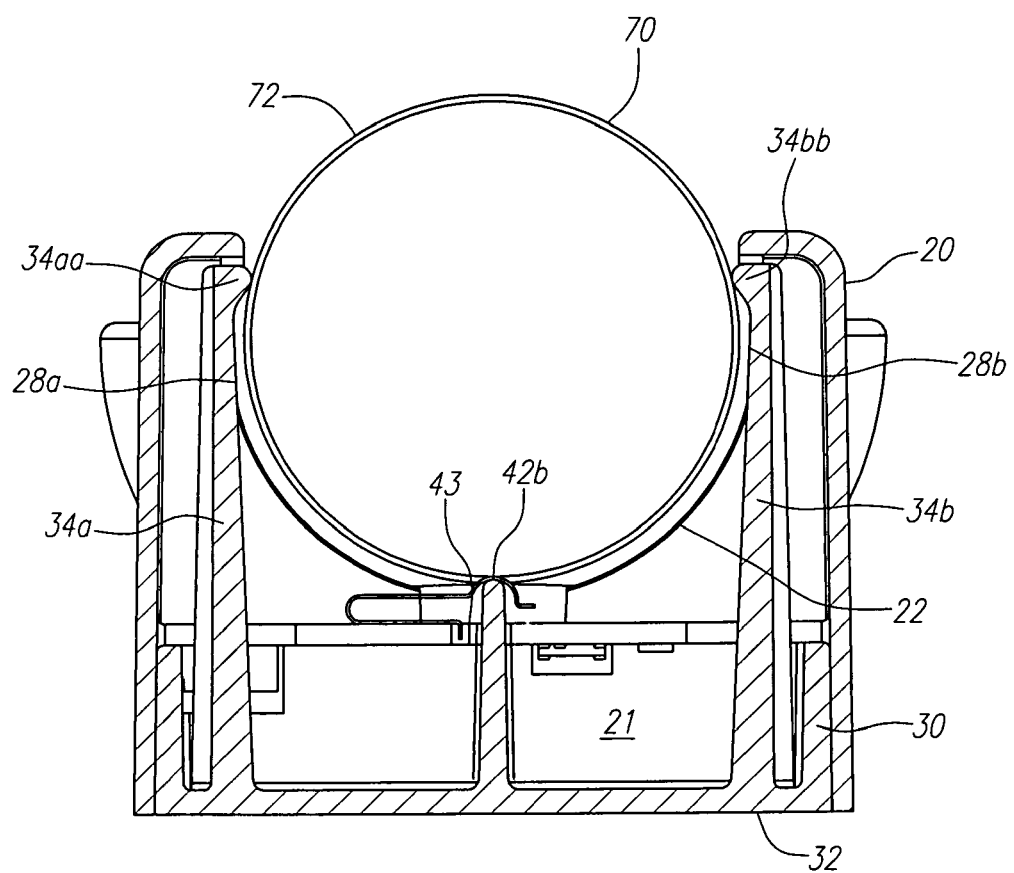
FIG. 3 is an axial cross sectional view of the assembled charger cradle with the barrel of a flashlight inserted.

Preferred embodiments of the current invention are now described with reference to the figures. Components appearing in more than one figure are identified by the same reference numeral. Components that appear in more than one embodiment may also be identified by the same or similar reference numerals.

A first embodiment of the current invention is now described with references to FIGS. 1-3. FIG. 1 shows components of a charger cradle 10 in an exploded view, FIG. 2 shows the components assembled and FIG. 3 shows a sectional end or front view with a flashlight installed in the charger cradle.

Charger cradle 10 may generally be configured to receive a lighting device such as a flashlight in order to recharge its power source. To this end, cradle 10 may include housing 20, base 30 and PCB 40. Housing 20 and base 30 may comprise plastic or other suitable material.

Housing 20, base 30 and PCB 40 are now further described regarding their configuration and assembly, and the manner in which they may receive a lighting device, such as a rechargeable flashlight, in order to recharge its power source. Later sections will describe how the charger cradle 10 works in conjunction with a lighting device.

As shown in FIG. 1, housing 20 may have a generally cylindrical upper section 22, a flared upper section 24 and a generally hollow bottom section 21. The sections 22, 24 may generally correspond to the cylindrical barrel and flared head of a flashlight (not shown). It should be noted that while the cradle 10 described herein shows a generally cylindrical shape, other shapes may be used to receive flashlights and other lighting devices that are not cylindrical. For example, cradle 10 may assume a square cross section to accommodate a similarly shaped lighting device. Accordingly, the current invention is not limited to a cylindrically shaped charger.

As discussed in more detail below, cradle 10 may receive and grip a flashlight while it is being recharged or otherwise stored. In addition, bottom section 21 may have dimensions so that it generally corresponds to base 30 such that base 30 may generally reside within bottom section 21. The bottom portion 32 of base 30 may generally form the bottom portion of cradle 10. Preferably, housing 20 and base 30 provides enough space so that PCB 40 may also reside within cradle 10.

The manner in which housing 20, base 30 and PCB 40 may be configured together to form cradle 10 is now discussed in more detail. Base 30 may have a shape and size that generally corresponds to the shape and size of bottom portion of bottom section 21 such that base 30 may generally fit inside bottom section 21. In a preferred embodiment, base 30 may fit within housing 20 so that their bottom surfaces are generally flush. It is also preferred that the fit between housing 20 and base 30 is snug so that there are no gaps between the bottom portion 32 of the base 30 and the outer edges of the generally hollow bottom section 21 to keep out dirt and other debris to protect PCB 40 and any other internal components.

PCB 40 may reside within the cavity formed by housing 20 and base 30. PCB may be supported by the upper surface of the base 30. To provide more support to PCB 40 and to allow PCB 40 to be readily positioned on base 30, the upper surface of base 30 may include at least one upward post 36a. Post 36a may be received by at least one support hole 30b formed on PCB 40. In a preferred embodiment, there are two upward posts as shown in FIG. 1 that correspond to two holes 30b on PCB 40. With the engagement of support post(s) 36a and support hole(s) 36b, PCB 40 may be securely positioned on the top surface of the base 30.

To assemble housing 20, base 30 and PCB 40 together in the configuration as shown in FIG. 1 and FIG. 2, screws 38 may pass through holes 36 on base 30, pass through holes 46 on PCB 40, and screw into receiving holes that may be located on the upper inner surface within housing 20. The receiving holes may be threaded to engage screws 38. Other means may be used to join housing 20 and base 30. Once screws 38 are tightly secured, housing 20, base 30 and PCB 40 may generally form cradle 10 as shown in FIG. 2.

As shown in FIG. 1, base 30 may also include left prong 34a and right prong 34b. These prongs may be used to grip and secure the lighting device within the cradle 10 as described in more detail below. In this configuration, housing 20 may include left cutout 28a to receive the left prong 34a and allow it to pass through the housing 20. Housing 20 may also similarly include right cutout 28b (not shown) to receive right prong 34b and allow it to pass through the housing 20 when the base 30 is secured to the bottom of housing 20.

PCB 40 is now described in more detail. PCB 40 may include a recharging circuit, electrical charging contacts 42a, 42b, an LED (not shown), a power plug receptacle 48, and a cutout 44 to accommodate prong 34b. These components will be discussed in detail below. In general, PCB 40 preferably has a shape and profile to allow it to fit between the various components of housing 20 and base 30 to contribute to an overall compact design of cradle 10. PCB may also include circuitry to perform other desired functions.

The recharging circuit of PCB 40 may provide the appropriate electrical current and voltage to properly recharge the rechargeable power source in the lighting device while the lighting device is engaged with the cradle 10. To make electrical contact with the rechargeable power source of the lighting device, PCB 40 may include electrical charging contacts 42a, 42b that may be configured and positioned to electrically contact the lighting device that is placed in cradle 10. In a preferred embodiment, cradle 10 is designed so that charging contacts 42a, 42b electrically contact commutating rings positioned on the exterior of the barrel of a flashlight, such as described in U.S. Provisional Application Nos. 61/751,935, filed Jan. 13, 2013; 61/791,905, filed Mar. 15, 2013, 61/839,362, filed Jun. 25, 2013 and 61/858,818, filed Jul. 26, 2013, the disclosures of which are incorporated by reference as if fully set forth herein. To this end, cylindrical section 22 of housing 20 may include cutouts (not shown) so that charging contacts 42a, 42b protrude through housing 20 and contact the commutating rings of the flashlight. The commutating rings on the outside barrel of the flashlight may then be connected to the rechargeable power source of the flashlight.

Cradle 10 is now further described with reference to FIG. 3 which shows a cross sectional view with a flashlight barrel inserted into cradle 10. As shown, electrical contact 42b on PCB 40 may pass through cutout 43 in housing 20 so that electrical contact 42b protrudes up to make contact with the commutating ring 72 on the outside of barrel 70 of the flashlight being recharged. Contact 42a may similarly protrude through housing 20 to electrically contact another commutating ring.

Referring again to FIG. 2, PCB 40 may include an LED (not shown) that emits a color when the flashlight's rechargeable power source is being charged by the recharging circuit of PCB 40. This color may be red but other colors may also be utilized. The LED may also emit a different color when the lighting device's rechargeable power source has been fully charged. Alternatively, the LED may simply not emit any color when charging is complete. By emitting a specific color when charging is in effect, and a different color or no color at all when the charging is complete, the recharging circuit on PCB 40 may advise the user as to the recharging status.

In the embodiment described herein, the LED may be contained within housing 20 and thus not readily visible to the user. Accordingly, cradle 10 may include light pipe 50 as shown in FIG. 1. Light pipe may transmit the colored light from the LED to a position on cradle 10 that is visible to the user, such as the surface of housing 20. FIG. 1 shows this light pipe 50 positioned to transmit light from LED location or hole 50a in PCB 40 where light from the LED may be transmitted up to hole 50b on the top surface of the housing 20.

As shown in FIG. 1, PCB 40 may also include receptacle 48 to receive a charging plug 62 that may be attached to an electrical cable 60 that may in turn be plugged into an electrical outlet or other external electrical power source (not shown). Cable 60 may be plugged into a wall outlet, cigarette lighter or other power source. Charging plug 62 may be connected to the recharging circuit on PCB 40 such that it may provide the necessary electrical current and voltage to the recharging circuit on the PCB 40 to allow the recharging circuit to recharge the lighting device's rechargeable power source when the lighting device is secured within the cradle 10.

In addition, base 30 may include a tab 37 with a cutout 37a that may receive and support receptacle 48 that may be attached to PCB 40. Housing 20 and base 30 may be configured so that when they are assembled, receptacle 48 is accessible by plug 62. To this end, housing 20 may include cutout 24a that receives and engages tab 37 with cutout 37a when base 30 is configured with housing 20 to generally form the bottom of the cradle 10. Cutout 24a in housing 20 may also accommodate any portion of receptacle 48 and any portion of charging plug 62 that may need to fit in this area.

As shown in FIG. 1, PCB 40 may also include cutout 44 to accommodate prong 34b such that PCB 40 does not block prong 34b as it extends up from base 30 through the cutout in the upper surface (not shown) in the housing 20. As noted earlier, PCB 40 is preferably configured to accommodate other components of cradle 10 so that the overall design may be compact.

Additionally, housing 20 may include hole 26, and base 30 may include a corresponding cutout 26a that may allow the cradle 10 to mounted on a wall or other surface. In this configuration, a screw (not shown) may pass through hole 26 on housing 20 and through cutout 26a on base 30, and then into a wall or other surface to secure cradle 10 to the wall or other mounting surface.

The assembled cradle 10 and the manner in which it may receive a lighting device such as a flashlight is now discussed in more detail with reference to FIGS. 2 and 3. As described above in relation to FIG. 1, and as also shown in FIG. 3, when cradle 10 is assembled, prong 34a on base 30 may extend upward and protrude through left cutout 28a on housing 20, and prong 34b may extend upward and protrude through right cutout 28b on housing 20. In this configuration, upper tab 34aa may protrude inward through left cutout 28a, and upper tab 34bb may protrude inward through right cutout 28b.

As described above in relation to FIG. 1, and as also shown in FIG. 3, housing 20 may be shaped to receive the cylindrical barrel 70 of a flashlight. In this configuration, prongs 34a, 34b and upper tabs 34aa, 34bb may protrude into the interior area of the cylindrical upper section 22.

The manner in which a lighting device may be inserted into cradle 10 is now further described. In a preferred embodiment, barrel 70 of a lighting device may be placed into the generally cylindrical upper section 22 of housing 20. Upon doing so, the flashlight barrel may contact upper tabs 34aa, 34bb of prongs 34a, 34b. It is preferred that prongs 34a, 34b comprise a resilient material that may be flexible. Accordingly, as the flashlight barrel is pressed into cradle 10, prongs 34a, 34b flex outward and allow the flashlight to pass through. Once the flashlight has been inserted into cradle 10, upper tabs 34aa, 34bb may return to their normal position and thus apply an inward force on the barrel 70 to securely hold it in place. This is described in detail below.

In a preferred embodiment, the spacing between inward facing upper tab 34aa and inward facing upper tab 34bb may be slightly or generally less than the diameter of the barrel 70 at the point where the barrel 70 is aligned with the upper tabs 34aa, 34bb. It is also preferred that the position of upper tabs 34aa, 34bb are located such that when the flashlight barrel 70 is inserted all the way into cradle 10, upper tabs 34aa, 34bb make contact with and generally engage the sides of the barrel 70 at a point that is above the cross sectional mid-point A of the barrel 70 as shown in FIG. 3.

The procedure to insert and secure barrel 70 into cradle 10 may be as follows. Barrel 70 may first be properly aligned with cradle 10 and then may be pressed into the generally cylindrical upper section 22 of housing 20. The sides of barrel 70 may then come into contact with the upper tabs 34aa, 34bb and because the spacing between tabs 34aa, 34bb may be less than the diameter of barrel 70, the barrel 70 may begin to apply an outward pressure to prongs 34a, 34b and upper tabs 34aa, 34bb as the barrel moves further into the generally cylindrical upper section 22 of housing 20.

This outward force may cause prongs 34a, 34b to spread apart to allow the passage of barrel 70 into the generally cylindrical upper section 22 of housing 20. To accommodate repeated recharging over the life of the flashlight, it is preferred that prongs 34a, 34b comprise a resilient material, such as plastic or other suitable material, that allows repeated bending without breaking. Barrel 70 may continue to exert an outward force on prongs 34a, 34b as it moves further into the generally cylindrical upper section 22 of housing 20 until it passes a point where the upper tabs 34aa, 34bb are positioned above the barrel's cross sectional mid-point A. Once upper tabs 34aa, 34bb pass this widest point of the barrel's cross section, barrel 70 may apply less pressure to the prongs 34a, 34b such that prongs 34a, 34b and the upper tabs 34aa, 34bb may close in on the sides of barrel 70 until the barrel 70 is inserted all the way into the generally cylindrical upper section 22.

To provide a secure fit, upper tabs 34aa, 34bb preferably continue to make contact with and engage the sides of barrel 70 when barrel 70 is completely inserted into housing 20. In this manner, prongs 34a, 34b, and upper tabs 34aa, 34bb apply an inward force on the sides of barrel 70. Because upper tabs 34aa, 34bb may be positioned above the mid-point of the cross section of the barrel, and the prongs 34a, 34b and the upper tabs 34aa, 34bb may be applying an inward force to the sides of barrel 70 at this point, barrel 70 may be held securely in place as shown in FIG. 3. The secure fit of the flashlight in cradle 10 may also be facilitated by an inward lip 24a on the forward end of cradle 10 that may prevent the flashlight from moving axially forward.

To remove the lighting device from cradle 10, the procedure described above may be followed in reverse order. That is, barrel 70 may be pulled outward from the generally cylindrical upper section 22 of cradle 10. This may cause barrel 70 to apply an outward force on prongs 34a, 34b until the cross sectional mid-point A of barrel 70 moves past the position of the upper tabs 34*aa*, 34*bb*. Because prongs 34*a*, 34*b* are preferably made of a resilient and flexible material, they will flex to allow the flashlight to be removed from cradle 10.

As mentioned above, it is preferred that prongs 34*a*, 34*b* comprise a resilient material that provides sufficient flexibility to allow repeated bending without breaking. To this end, prongs 34*a*, 34*b* are sufficiently flexible so that it is not overly difficult to insert the lighting device in cradle 10. Prongs 34*a*, 34*b* also preferably comprise a material that provides sufficient rigidity so that prongs 34*a*, 34*b* apply a sufficient inward force on barrel 70 when it is inserted into cradle 10 to adequately secure the lighting device in cradle 10 while it is being recharged or when the lighting device is stored in cradle 10.

The manner in which a lighting device may be properly aligned in cradle 10 to permit recharging is now discussed in further detail with reference to FIG. 2 and FIG. 3. In general, cradle 10 allows the flashlight to be inserted so that recharging contacts 42*a*, 42*b* electrically contact the commutating rings located on the flashlight's barrel 70.

As shown in FIG. 2, housing 20 may have a generally cylindrical upper section 22 and a flared upper section 24. The sections 22, 24 may generally correspond to the cylindrical barrel and flared head of a flashlight (not shown). In this manner, the user will readily recognize that the flashlight should be inserted into cradle 10 so that the head fits into the flared section 24 and the barrel 70 fits into the cylindrical section 22. The flashlight would preferably not fit into cradle 10 if inserted in the reverse position.

In addition, flared upper section 24 of the cradle 10 may include a front rim 24*a* that may be located on or near the front edge on the circumference of the flared upper section 24 as shown in FIG. 2. This front rim 24*a* may also act as a guide to properly position the flashlight into the cradle 10. That is, the front rim 24*a* may act as a stop such that the flared head of a flashlight may not be inserted into the flared upper section 24 of the cradle 10 with any portion of the flared head of the flashlight protruding from the front end of the upper flared section 24. By preventing any portion of the flared head of the flashlight from protruding from the front end of the upper flared section 24, the front rim 24*a* may hold the flared head of a flashlight in the proper position such that the electrical contacts 42*a*, 42*b* may make proper contact with the commutating rings on the outside of the barrel 70 of the flashlight in order to recharge the flashlight's rechargeable power source.

In view of the foregoing, the charging cradle 10 of the current invention provides at least the following advantages over prior charger cradle designs.

First, the use of flexible prongs 34*a*, 34*b* may avoid the need for hinged or other moving parts to receive and secure the lighting device in cradle 10. This increases durability eases manufacturing and lowers cost.

Second, the components of cradle 10 preferably fit together to avoid components sticking out from the profile of housing 20 and base 30. This avoids components protruding from the cradle that might easily be broken off. This compact design also makes it easier to store the cradle, such as in a suitcase when traveling.

Third, the shape of cradle 10 makes it intuitively easy to insert the flashlight into the cradle in the proper position, and avoids inserting it in the reverse position.

Figure 5A:
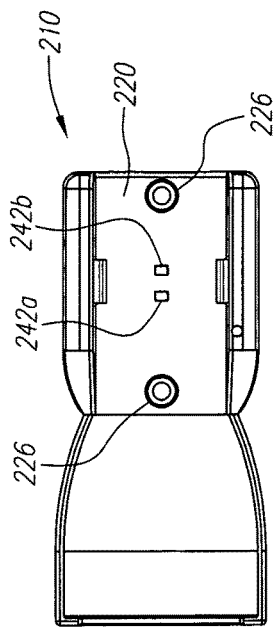
FIG. 5A is a top view of an assembled charger cradle.
Figure 5B:
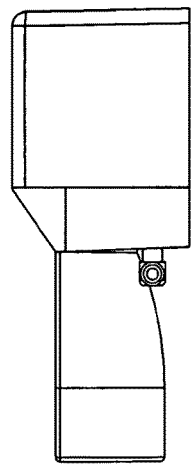
FIG. 5B is a side view of an assembled charger cradle.
Figure 5C:
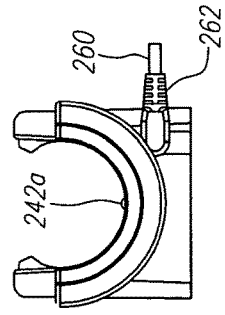
FIG. 5C is an end view of an assembled charger cradle.
Figure 4:
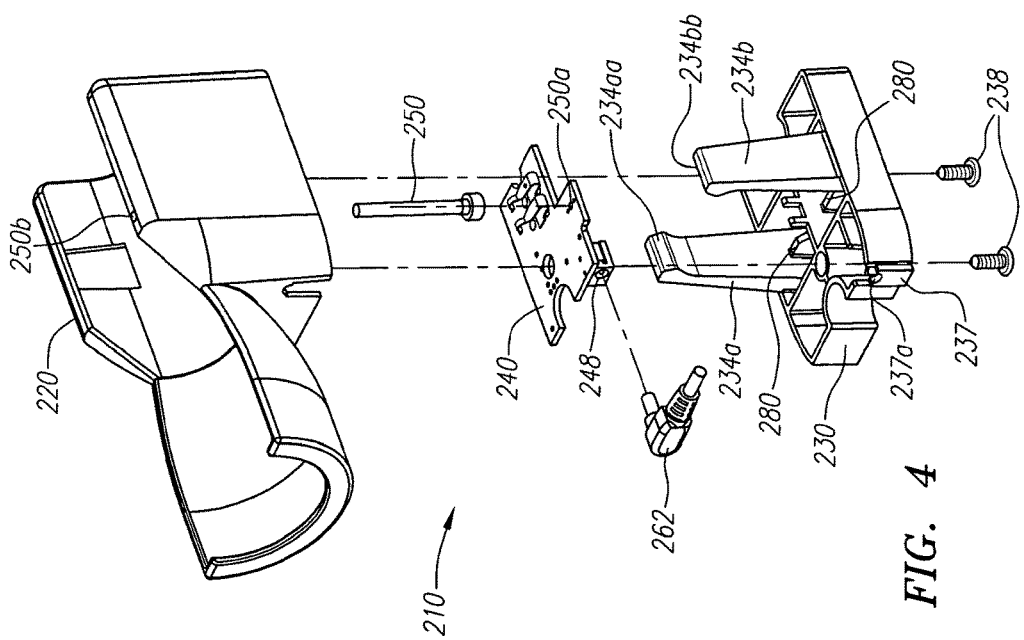
FIG. 4 is an exploded view showing the components of another embodiment of a charger cradle.

Another preferred embodiment of the current invention is now described with reference to FIGS. 4, 5A, 5B and 5C. FIG. 4 shows components of charger cradle 210 in an exploded view, while FIGS. 5A, 5B and 5C show the components of an assembled charger cradle 210 in top, front and side views, respectively. As shown in the figures, cradle 210 may be similar in to cradle 10 described above, and similar components bear similar reference numerals in the 200s, such as left and right prongs 234*a*, 234*b*, upper tabs 234*aa*, 234*bb* and screws 238. However, there may be several differences.

For example, the location of the power plug receptacle 248 on PCB 240 may differ. As shown, power plug receptacle 248 may be located at the front of base 230, thereby offering an alternative and convenient orientation for the electrical cable 260 and the charging plug 262. This may be preferred where the power supply, e.g., wall outlet or cigarette lighter from which cable 260 will extend, is located so that it would be more convenient to plug in cradle 210 at its front. To accommodate this different location of receptacle 248, PCB 240 may be shaped differently and its electrical tracings may be relocated accordingly.

Light pipe 250 may also be positioned differently. As shown, light pipe 250 may be located by LED location or hole 250*a* in PCB 240, and the hole 250*b* on the top surface of housing 220 may be located at the front of the charging cradle 210, rather than at its rear. This location may put light pipe 250 closer to where the power plug receptacle 248 is located, which may improve the convenience experienced by the operator as the light pipe 250 and the power plug receptacle 248 components, are closer to each other.

The size and shape of housing 220 may vary in order to accommodate the different location of port 248. More specifically, base 230 may include tab 237 and cutout 237*a* at the appropriate location to correspond to port 248. Furthermore, base 230 may include posts or projections 280 to support PCB 240 and/or to provide overall strength and rigidity to cradle 210. The size and shape of housing 220 may also accommodate any adjustments made to the size and shape of base 230 so that they fit together snugly to protect PCB 240 and any other internal components therein.

As shown in FIG. 5A, housing 220 may include two holes to allow electrical contacts 242*a*, 242*b* to protrude through in order to make electrical contact with the commutating rings of a flashlight. The size and shape of the holes may vary to accommodate differently sized electrical contacts. Housing 220 may also include holes 226 that may accommodate screws or other fastening means (not shown) that may attach cradle 210 to a wall or other mounting surface.

Figure 6:
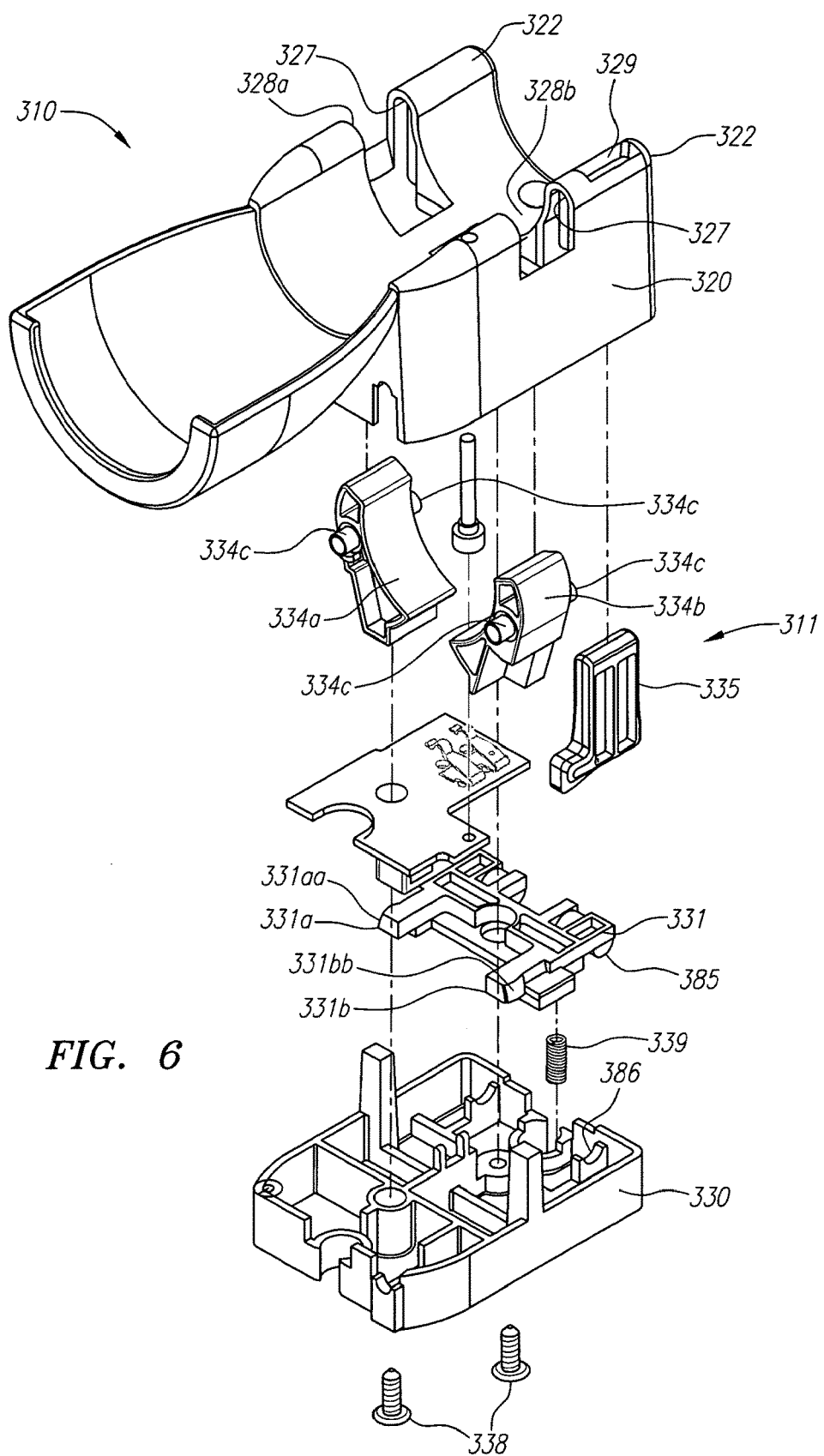
FIG. 6 is an exploded view showing the components of another embodiment of a charger cradle.
Figure 7:
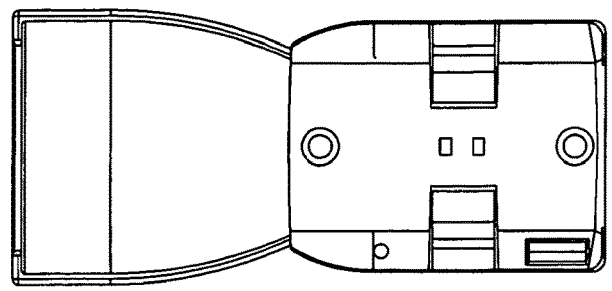
FIG. 7 is a top view of an assembled charger cradle.
Figure 8:
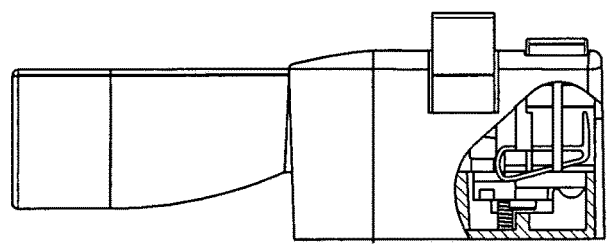
FIG. 8 is a side view of an assembled charger cradle including a partial section view.
Figure 9:
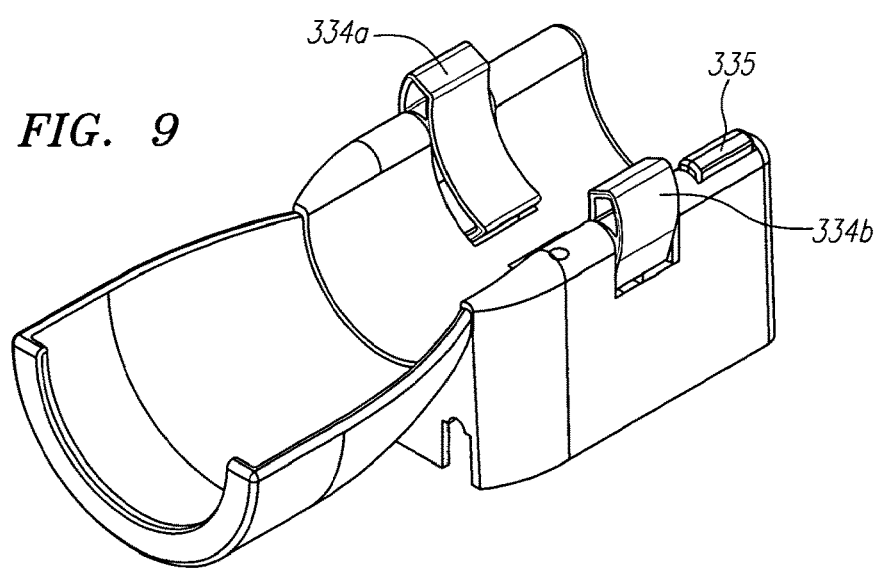
FIG. 9 is a perspective view of an assembled charger cradle.
Figure 10:
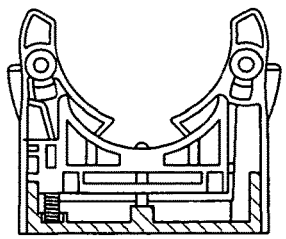
FIG. 10 is an end section view of a charger cradle showing more detail of a cradle arm mechanism.

Another embodiment of charger cradle 310 of the current invention is now described with reference to FIGS. 6 through 13. FIG. 6 shows an exploded view of the components that make up charger cradle 310. FIG. 7 is a top view of the assembled charger cradle 310. FIG. 8 is a side view of an assembled charger cradle 310 with cradle arm mechanism detail depicted in Section A-A. FIG. 9 is perspective view of an assembled charger cradle 310. FIG. 10 is a section view of the cradle arm mechanism. FIGS. 11A-11D are multiple views of an assembled charger cradle 310 with flashlight 390 inserted. FIGS. 12A-12D is a set of perspective, top, front and side views depicting the cradle arm mechanism in an open mode. FIGS. 13A-13D is a set of perspective, top, front and side views depicting the cradle arm mechanism in a closed mode.

The cradle 310 of this embodiment may be similar in various aspects to the embodiment described above. To this end, many of the components of cradle 310 have similar reference numerals, but in the 300s, such as screws 338. However, cradle 310 may include different components as described in more detail below.

Referring to FIG. 6, for example, cradle 310 may include a clamping system or mechanism 311 that receives the lighting device 390 and holds it in place in cradle 310 until it is released. Clamping system 311 may include pivoting cradle arm stop 331, spring 339, rotating left cradle arm 334a, rotating right cradle arm 334b and release button 335. As discussed in more detail below, cradle arm stop 331 may generally be urged upward by spring 339 so that cradle arm stop 331 engages cradle arms 334a, 334b to keep them in an open position to receive flashlight 390.

As flashlight 390 is pressed into cradle 310, flashlight 390 urges the bottoms of cradle arms 334a, 334b apart, causing arms 334a, 334b rotate about their pivoting axes 334c. This also causes cradle arms 334a, 334b to press down on cradle arm stop 331 so that it pivots downward against spring 339. As flashlight 390 is pressed further into cradle 310, arms 334a, 334b rotate further so that their bottom portions become far enough apart so that cradle arm stop 331 snaps into place and wedges in between them. As arms 334a, 334b rotate, the upper portions of arms 334a, 334b are brought closer together in a closed position to secure flashlight 390 for recharging or storage.

To remove flashlight 390 from cradle 310, release button 335 may be pressed down and flashlight 390 is lifted up. Pressing down on button 335 causes cradle arm stop 331 to pivot downward thereby allowing the bottoms of cradle arms 334a, 334b to move towards each other so that arms 334a, 334b may rotate back to an open position. The rotation of arms 334a, 334b is caused by the widest point of the flashlight barrel passing by the tops of arms 334a, 334b thereby spreading them apart. After cradle stop 331 is pressed down from its wedged-in position, the bottoms of cradle arms 334a, 334b may move toward each other as the upper portions of cradle arms 334a, 334b move apart as the flashlight 390 is removed.

Cradle arms 334a, 334b are now described in more detail. As shown, arms 334a, 334b may be used in lieu of the bendable prongs discussed above, to receive and exert force and grasp onto a lighting device 390 to keep it in place while being recharged. Cradle arms 334a, 334b may comprise a rigid material that resists bending or flexing unlike the flexible prongs described above. As discuss in more detail below, instead of flexing to receive the lighting device, rigid cradle arms 334a, 334b may generally exist in an open position whereby arms 334a, 334b are spaced far enough apart to receive the lighting device 390, but may then rotate about their axes to move to a closed position when the lighting device 390 is inserted into cradle 310. In the closed position, arms 334a, 334b may move closer to each other so as to grasp the lighting device 390 for recharging and/or storage.

The interiors of cradle arms 334a, 334b are preferably shaped to correspond to or otherwise accommodate the shape of lighting device 390. For example, where lighting device 390 is a flashlight having a cylindrical barrel, the inner curved surface of cradle arms 334a and 334b may match the curvature of the barrel so as to effect a firm grasp on the flashlight. FIG. 11A shows an example of the close fit between cradle arms 334a, 334b and flashlight 390 being held in cradle 310.

The firm grip on flashlight 390 may provide several benefits. For example, where cradle 310 is mounted to the interior of a police car, rechargeable flashlight 390 may be firmly secure in cradle 310 so that it does not fall out even as the car goes over bumps in the road.

The manner in which cradle arms 334a, 334b may rotate between open and closed positions is now further described.

As shown in FIG. 6, housing 320 may include cutouts 328a, 328b in each of its wall portions 322. Cutouts 328a, 328b are preferably sized so that cradle arms 334a, 334b may fit and rotate therein. The interior surface of wall portions 322 may form a feature 327 that in the embodiment shown form upside U sections. Cradle arms 334a, 334b may include cradle arm nubs or projections 334c that may extend forward and rearward from the clamping portion of the arms. Nubs 334c may form axles that engage the interior surfaces or features 327. Nubs 334c and features 337 are sized to correspond to each other so that cradle arms 334a, 334b may be supported thereby and also rotate between open and closed positions. Axles 334c may snap into place in features 327, or may be held in place by the components below them in cradle 310.

Cradle arm stop 331 and the manner in which it pivots are now further described. Cradle arm stop 331 preferably comprises a rigid plastic or other material, and may also include ribs and other stiffening features as shown in FIG. 6. As also shown, stop 331 may include arms 331a, 331b that may engage cradle arms 334a, 334b as described below. It is preferred that cradle stop 331 be configured so that it fits within housing 320 and bottom 330, and so that it accommodates other components, so that cradle 310 may be compact. For example, arms 331a, 331b may extend on either side of PCB 340 so that stop 331 and PCB 340 do not interfere with each other.

Cradle arm stop 331 may be mounted to base 330 and pivot with respect thereto. To this end, stop 331 may include pivot points 385 that engage pivot troughs 386 of base 330. As shown, pivot points 385 may comprise downward facing hemispheres and troughs 386 may comprise corresponding concave surfaces. As the forward end of stop 331 is raised and lowered, pivots 385 may rotate within pivot troughs 386 to provide this range of motion.

Spring 339 may be located between base 330 and cradle arm stop 331 so that it urges stop 331 upward. To this end, base 330 may include a post or other upward projection to accommodate the bottom end of spring 339. The top end of spring 339 may engage the bottom surface of stop 331. Spring 339 is preferably stiff enough to urge cradle arm stop 331 upward when cradle 310 is in an open position, and to lock stop 331 between cradle arms 334a, 334b when cradle 310 is in a closed position. At the same time, spring 339 is preferably still flexible enough so that it may compress when lighting device 390 is inserted into cradle 310 or when release button 335 is pressed as discussed below.

Figure 12A:
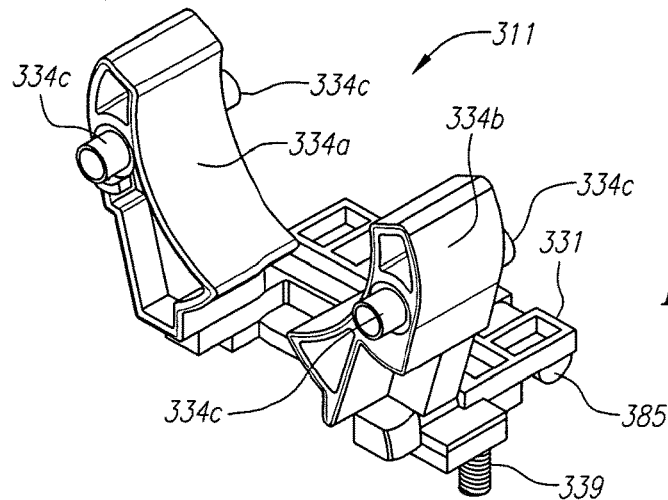
FIGS. 12A, 12B, 12C and 12D are perspective, top, front and side views depicting cradle arms in an open mode.
Figure 12B:
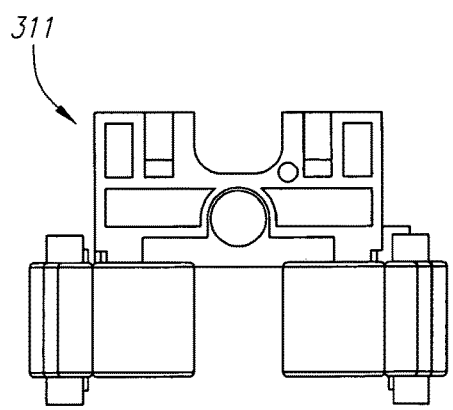
Figure 12C:
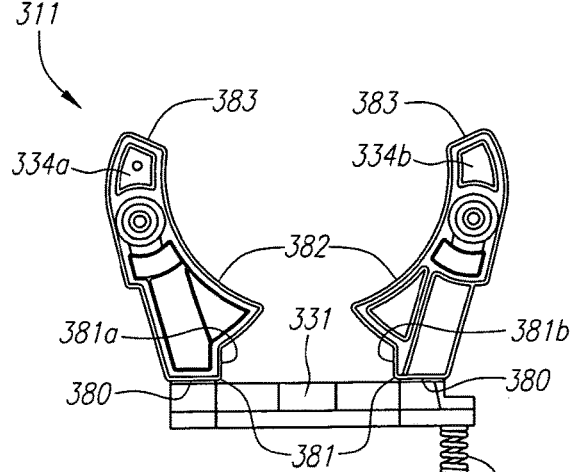
Figure 12D:
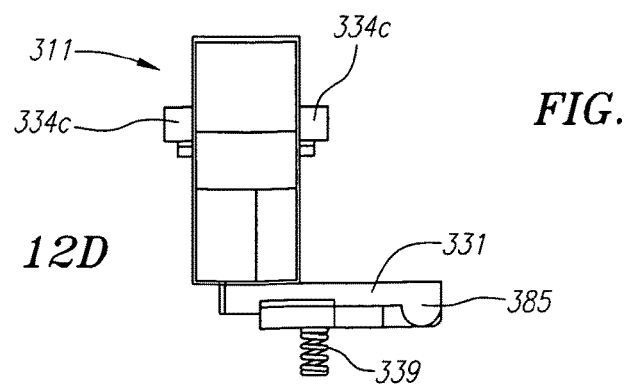

Release button 335 is now further described. Button 335 may pass through cutout 329 in housing 320 so that it is readily accessible to the user. The bottom of button 335 may engage cradle arm stop 331 as shown in FIGS. 12D and 13D, so that stop 331 is pressed down when the user presses down on button 335. As discussed in more detail below, as stop 331 is pressed down by button 335 and flashlight 390 is lifted up, the bottoms 380 of cradle arms 334a, 334b are allowed to move toward each other as the tops 383 of arms 334a, 334b are spread by the diameter of the flashlight barrel. In this manner, arms 334a, 334b go from a closed position to an open position.

The manner in which clamping or grasping mechanism 311 operates is now further described, mainly with reference to FIGS. 12A-12D and 13A-13D. FIGS. 12A-12D depict clamping mechanism 311 in an open position and FIGS. 13A-13D depict clamping mechanism in a closed position. When in an open position, the bottoms 381 of cradle arms 334a, 334b rest upon the top surfaces of arms 331a, 331b of cradle arm stop 331. Arms 334a, 334b are configured so that their bottom surfaces 381 are resting on horizontal when in a closed position so that they match the horizontal upper surface of stop arms 331*a*, 331*b* in an open position. Spring 339 applies upward pressure to the bottom of the forward end of cradle arm stop 331 to maintain this engagement and keep cradle arms 334*a*, 334*b* in an open mode. In this mode, the tops 383 of arms 334*a*, 334*b* are spaced far enough apart to be able to receive lighting device 390. Where lighting device 390 is a flashlight with a cylindrical barrel, the distance between the tops 383 of arms 334*a*, 334*b* is the same as or greater than the diameter of the flashlight barrel.

As lighting device 390 is pressed into cradle 310, clamping mechanism 311 goes from the open position of FIGS. 12A-12D to the closed position of FIGS. 13A-13D as follows. As the barrel of flashlight 390 is pressed down into charger cradle 310, the barrel presses down on cradle arm bottom curve sections or points 382, thereby spreading the cradle arm bottom points 381 away from each other. This will cause cradle arm stop 331 to pivot in a downward motion, making the upper surface of stop arms 331*a*, 331*b* travel down. At the same time, the tops 383 of arms 334*a*, 334*b* move towards each other. As flashlight 390 is pressed further into cradle 310, bottom points 381 become far enough apart that the distance between them is greater than the distance between the outer edges or sides 331*aa*, 331*bb* of arms 331*a*, 331*b* of cradle arm stop 331.

When this occurs, the upward force of spring 339 moves cradle arm stop 331 upward so that its arms 331*a*, 331*b* move between cradle arms 334*a*, 334*b*. More specifically, outer surface 334*aa* will engage inner surface 381*a* and outer surface 334*bb* will engage inner surface 381*b*. As shown, these surfaces may be angled so that they correspond to each other. As such, surfaces 331*aa*, 331*bb* rise up and wedge between surfaces 381*a*, 381*b*. The upward movement of cradle arm stop 331 is facilitated by the pivoting provided by pivot points 385 and pivot troughs 386. The upward force provided by spring 339 maintains that spread orientation of arm bottoms 381.

At the same time as the foregoing occurs, the top portions 383 of cradle arms 334*a*, 334*b* move closer to each other to grasp flashlight 390. This occurs due to the rotation of arms 334*a*, 334*b* about their axes 334*c* rotating in features 327 in housing 320. When flashlight 390 is inserted all the way into cradle 310, the tops 383 of arms 334*a*, 334*b* will be located above the center line of the flashlight barrel, and the distance between tops 383 will be less than the barrel diameter so as to firmly hold flashlight 390 in place for a recharging operation or storage. The upward force provide by spring 339 maintains the position of cradle arm stop 331 between the cradle arm points 381 to maintain this closed position.

The release of flashlight 390 from cradle 310 is now described. When the lighting device 390 is charged, or the user otherwise wants to remove the lighting device 390 from cradle 310, the user may press down on release button 335. The user may also lift flashlight 390 out of cradle 310 when doing so.

When this occurs, button 335 pushes down on cradle arm stop 331, which in turn pushes down on spring 339. As this occurs, the rear of stop 331 will pivot via pivot points 385 and pivot troughs 386, and the cradle stop arms 331*a*, 331*b* will move downward. This allows the cradle arm points 381 to move toward each other. At the same time, as flashlight 390 is pulled up out of cradle 310, its barrel diameter will engage the tops 383 of arms 334*a*, 334*b* and press them apart. This causes rotation of arms 334*a*, 334*b* about their axles 334*c*, which in turn causes bottom points 381 to move close enough together to avoid the wedging effect of stop 331. When arms 334*a*, 334*b* are rotated back to an open position, their bottoms 381 will rest upon arms 331*a*, 331*b* of cradle stop 331, and spring 339 will press stop 331 upward to maintain that open position.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A charger cradle for recharging a flashlight having a barrel, comprising:
   a housing having a bottom base and a support configured to receive at least a first portion of the barrel;
   a first electrical contact and a second electrical contact configured for charging the flashlight when the flashlight is inserted into the support;
   two opposing rotating cradle arms mounted within the housing, each of which is configured to rotate between an open position and a closed position, each of which is configured with an upper section and a lower section;
   a cradle arm stop mounted within the housing configured to engage the lower section of each of the two opposing rotating cradle arms in the closed position and prevent each of the two opposing rotating cradle arms from rotating out of the closed position toward the open position while the cradle arm stop engages the two lower sections of the two opposing rotating cradle arms;
   a biasing means for biasing the cradle arm stop upwardly away from the bottom base toward the support;
   a release button configured to push down on the cradle arm stop which pushes down on the biasing means to disengage the two lower sections of the two opposing rotating cradle arms and allow the two opposing rotating cradle arms to rotate to the open position until a release button is actuated to disengage the cradle arm stop and thereby allow said two opposing rotating cradle arms to each rotate to said open position;
   wherein each of the two opposing rotating cradle arms is configured to receive a second portion of the flashlight when the flashlight is inserted in between the two opposing rotating cradle arms in the open position and lock the flashlight in the charger cradle when insertion of the flashlight into the charger cradle causes said two opposing rotating cradle arms to rotate into the closed position where they are engaged by the cradle arm stop.

2. The charger cradle of claim 1, further comprising an LED to indicate when charging occurs.

3. The charger cradle of claim 2, further comprising a light pipe to transmit light from the LED to a surface of the cradle.

4. The charger cradle of claim 1, wherein the housing includes a cylindrical portion and a flared portion.

5. The charger cradle of claim 1, wherein a printed circuit board ("PCB") is mechanically secured to a top surface of the base.

6. The charger cradle of claim 5, wherein the PCB is mechanically secured to a top surface of the base at two locations.

7. The charger cradle of claim 5, wherein the housing is attached to the base by a plurality of mechanical fasteners.

8. The charger cradle of claim 7, wherein the plurality of mechanical fasteners pass through a plurality of apertures in the PCB.

9. A cradle for a flashlight having a barrel, comprising:
a housing having a bottom base and a support configured to receive at least a first portion of the barrel;
two opposing rotating cradle arms mounted within the housing, each of which is configured to rotate between an open position and a closed position, each of which is configured with an upper section and a lower section;
a cradle arm stop mounted within the housing configured to engage the lower section of each of the two opposing rotating cradle arms in the closed position and prevent each of the two opposing rotating cradle arms from rotating out of the closed position toward the open position while the cradle arm stop engages the two lower sections of the two opposing rotating cradle arms;
a biasing means for biasing the cradle arm stop upwardly away from the bottom base toward the support;
a release button configured to push down on the cradle arm stop which pushes down on the biasing means to disengage the two lower sections of the two opposing rotating cradle arms and allow the two opposing rotating cradle arms to rotate to the open position until a release button is actuated to disengage the cradle arm stop and thereby allow said two opposing rotating cradle arms to each rotate to said open position;
wherein each of the two opposing rotating cradle arms is configured to receive a second portion of the flashlight when the flashlight is inserted in between the two opposing rotating cradle arms in the open position and lock the flashlight in the cradle when insertion of the flashlight into the cradle causes said two opposing rotating cradle arms to rotate into the closed position where they are engaged by the cradle arm stop.

10. A cradle for a flashlight having a barrel, comprising:
a housing configured to receive at least a first portion of the barrel;
two opposing rotating cradle arms held by the housing, each of which is configured to rotate between an open position and a closed position, each of which is configured with an upper section and a lower section;
a cradle arm stop held by the housing configured to engage the lower section of each of the two opposing rotating cradle arms in the closed position and prevent each of the two opposing rotating cradle arms from rotating out of the closed position toward the open position while the cradle arm stop engages the two lower sections of the two opposing rotating cradle arms;
a biasing means for biasing the cradle arm stop from the open position to the closed position;
a release button configured to push down on the cradle arm stop which pushes down on the biasing means to disengage the two lower sections of the two opposing rotating cradle arms and allow the two opposing rotating cradle arms to rotate to the open position until a release button is actuated to disengage the cradle arm stop and thereby allow said two opposing rotating cradle arms to each rotate to said open position;
wherein each of the two opposing rotating cradle arms is configured to receive a second portion of the flashlight when the flashlight is inserted in between the two opposing rotating cradle arms in the open position and lock the flashlight in the cradle when insertion of the flashlight into the cradle causes said two opposing rotating cradle arms to rotate into the closed position where they are engaged by the cradle arm stop.

* * * * *